(12) United States Patent
Yang et al.

(10) Patent No.: US 7,651,265 B2
(45) Date of Patent: Jan. 26, 2010

(54) INFRARED CLINICAL THERMOMETER

(75) Inventors: Gavin Yang, HsinChu (TW); Jason Liao, HsinChu (TW); Vincent Weng, HsinChu (TW); Eileen Chen, HsinChu (TW)

(73) Assignee: Radiant Innovation Inc., Hsinchu (TW)

( * ) Notice: Subject to any disclaimer, the term of this patent is extended or adjusted under 35 U.S.C. 154(b) by 150 days.

(21) Appl. No.: 11/761,384

(22) Filed: Jun. 12, 2007

(65) Prior Publication Data

US 2007/0291820 A1   Dec. 20, 2007

(30) Foreign Application Priority Data

Jun. 16, 2006   (TW) .............................. 95121549 A
Feb. 9, 2007    (TW) .............................. 96104784 A (51) Int. Cl.
*G01J 5/04* (2006.01)
(52) U.S. Cl. ................... 374/121; 374/208; 374/163; 374/183; 600/549
(58) Field of Classification Search ................ 374/163, 374/120–121, 100, 208, 170, 183; 600/474, 600/549; 702/139
See application file for complete search history.

(56) References Cited

U.S. PATENT DOCUMENTS 3,857,285 A * 12/1974 Athey et al. ................. 374/183
4,679,949 A * 7/1987 Sakamoto ................... 374/183
4,863,281 A * 9/1989 Suszynski ................... 374/158
5,167,235 A * 12/1992 Seacord et al. .............. 600/474
5,293,877 A * 3/1994 O'Hara et al. ............... 600/549
5,340,215 A * 8/1994 Makita et al. ............... 374/121
5,458,121 A * 10/1995 Harada ........................ 600/474
5,991,652 A * 11/1999 Barthelemy et al. ......... 600/474
6,406,182 B1* 6/2002 Chen ........................... 374/208
6,485,433 B1* 11/2002 Peng ........................... 600/549
6,637,935 B2* 10/2003 Chen ........................... 374/185
6,751,497 B2* 6/2004 Fraden ........................ 600/474
6,789,936 B1* 9/2004 Kraus et al. ................. 374/121
6,886,878 B2* 5/2005 Schambre et al. ......... 296/65.09
6,991,368 B2* 1/2006 Gerlitz ........................ 374/121
7,083,330 B1* 8/2006 Yao ............................ 374/209
7,338,206 B2* 3/2008 Yu ............................. 374/208
2004/0047392 A1* 3/2004 Wu et al. ..................... 374/121
2005/0043631 A1* 2/2005 Fraden ........................ 600/474
2005/0080354 A1* 4/2005 Crossley ..................... 600/549
2007/0282218 A1* 12/2007 Yarden ....................... 600/549
2008/0285618 A1* 11/2008 Chen .......................... 374/121

FOREIGN PATENT DOCUMENTS

TW            463038       11/2001

* cited by examiner

*Primary Examiner*—Gail Verbitsky
(74) *Attorney, Agent, or Firm*—Ming Chow; Sinorica, LLC (57) ABSTRACT

The present invention discloses an infrared clinical thermometer, which can measure both the forehead and ear temperatures, wherein after moving the temperature sensing unit close to an intended site, the user can obtain the temperature of the intended site via merely pressing the forehead or ear temperature button.

11 Claims, 11 Drawing Sheets

INFRARED CLINICAL THERMOMETER

BACKGROUND OF THE INVENTION

1. Field of the Invention

The present invention relates to a thermometer, particularly to an infrared thermometer, which can detect the ear temperature and the forehead temperature.

2. Description of the Related Art

The invention of the infrared ear thermometer realizes a fast temperature measurement. Especially for a disobedient or sick child, an infrared ear thermometer is more favorable than a mercury thermometer. However, the infrared ear thermometer is not suitable for some people, such as those who have an ear defect. Thus, the principle of the infrared ear thermometer is extended to develop an infrared forehead thermometer.

Figure 1:
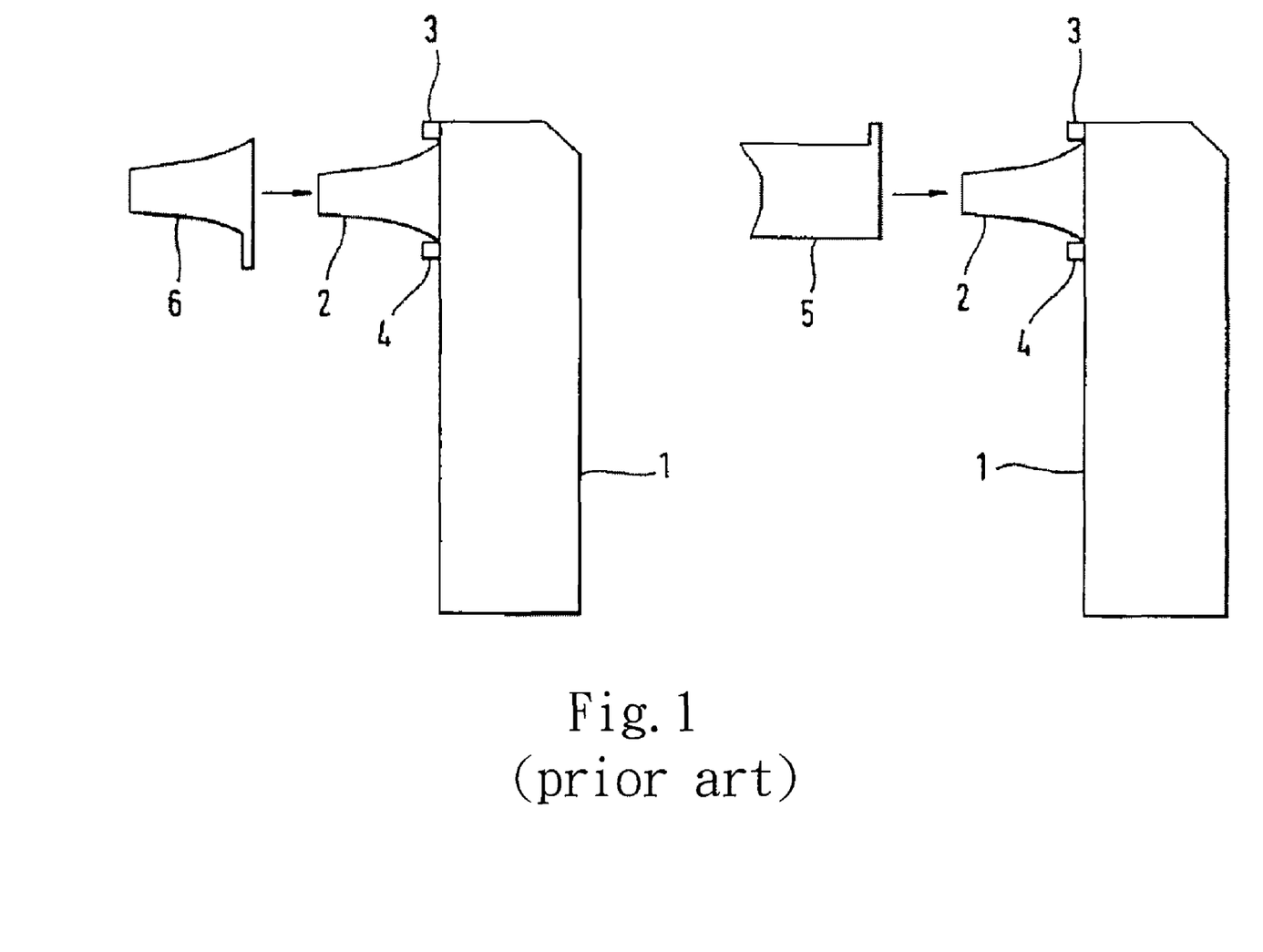
FIG. 1 is a diagram schematically showing a conventional infrared clinical thermometer capable of measuring the ear and forehead temperatures.

Refer to FIG. 1. A Taiwan patent No. 463038 disclosed an infrared clinical thermometer capable of measuring the ear temperature and the forehead temperature. As shown in FIG. 1, the conventional infrared clinical thermometer 1 comprises a probe 2 at the front end of the thermometer 1, a first switch 3 at a position above the probe 2, a second switch 4 at a position below the probe 2, a first probe cover 5 and a second probe cover 6. The first switch 3 and the second switch 4 are respectively used to start a forehead temperature measurement and an ear temperature measurement. The first probe cover 5 and the second probe cover 6 are respectively used to operate the first switch 3 and the second switch 4. When the user intends to measure a forehead temperature, he sleeves the probe 2 with the first probe cover 5 to operate the first switch 3 and start a forehead temperature measurement. When the user intends to measure an ear temperature, he sleeves the probe 2 with the second probe cover 6 to operate the second switch 4 and start an ear temperature measurement.

However, the conventional technology needs two different probe covers to respectively start a forehead temperature measurement and an ear temperature measurement. Besides, the user will be inconvenienced once the probe cover is lost.

Accordingly, the present invention proposes a more convenient two-in-one infrared clinical thermometer capable of measuring the ear temperature and the forehead temperature to overcome the abovementioned problems.

SUMMARY OF THE INVENTION

The primary objective of the present invention is to provide an infrared clinical thermometer, wherein the user can fast obtain a forehead temperature or an ear temperature via only pressing a forehead temperature button or an ear temperature button of the infrared clinical temperature.

Another objective of the present invention is to provide an easy-operation and low-cost infrared clinical thermometer.

Yet another objective of the present invention is to provide an infrared clinical thermometer, wherein the forehead temperature button and the ear temperature button are arranged in appropriate positions to meet the operational posture and help the user press the correct button when the user measures the forehead temperature or the ear temperature.

Further another objective of the present invention is to provide an infrared clinical thermometer, wherein the infrared clinical thermometer has a slide cover sliding on a slide rail. When the slide cover is moved toward the top of the thermometer, the temperature sensing unit is concealed inside the slide cover, and only the forehead temperature button is revealed. When the slide cover is moved toward the bottom of the thermometer, the temperature sensing unit emerges from the opening of the slide cover, and only the ear temperature button is revealed. Such a design can guarantee that the measurement of the forehead temperature or the ear temperature is correctly performed.

To achieve the abovementioned objectives, the present invention proposes an infrared clinical thermometer, which comprises a thermometer body; a temperature sensing unit at one end of the thermometer body and having an infrared sensor therein for detecting infrared radiation; a forehead temperature button and an ear temperature button on the body; and a microprocessor coupled to the infrared sensor, the forehead temperature button and the ear temperature button. After the user moves the infrared clinical thermometer of the present invention close to the forehead or the ear, he can obtain the forehead temperature or the ear temperature via merely pressing the forehead temperature button or the ear temperature button. Further, the forehead temperature button and the ear temperature button are on different surfaces of the thermometer body lest the user press a wrong button when he performs a temperature measurement.

Further, according to another embodiment of the present invention, the infrared clinical thermometer has a slide cover with an opening at the front end. The surface of the thermometer body has a slide rail corresponding to the slide cover. The slide rail has a first blocker and a second blocker, and the first blocker is closer to the temperature sensing unit than the second blocker. The forehead temperature button, the ear temperature button, the first blocker and the second blocker are arranged on a same surface of the thermometer body. When the slide cover is moved to the first blocker, the ear temperature button is concealed, and the forehead temperature button is revealed, and the temperature sensing unit is within the slide cover; thereby, a forehead temperature measurement can be correctly undertaken. When the slide cover is moved to the second blocker, the forehead temperature button is concealed, and the ear temperature button is revealed, and the temperature sensing unit emerges from the opening of the slide cover; thereby, an ear temperature measurement can be correctly undertaken.

Below, the embodiments are described in detail in cooperation with the attached drawings to make easily understood the objectives, technical contents and accomplishments of the present invention.

DETAILED DESCRIPTION OF THE INVENTION

The present invention pertains to an infrared clinical thermometer, which can measure both the forehead and ear temperatures. The present invention will be exemplified with an infrared ear thermometer below.

Figure 2:
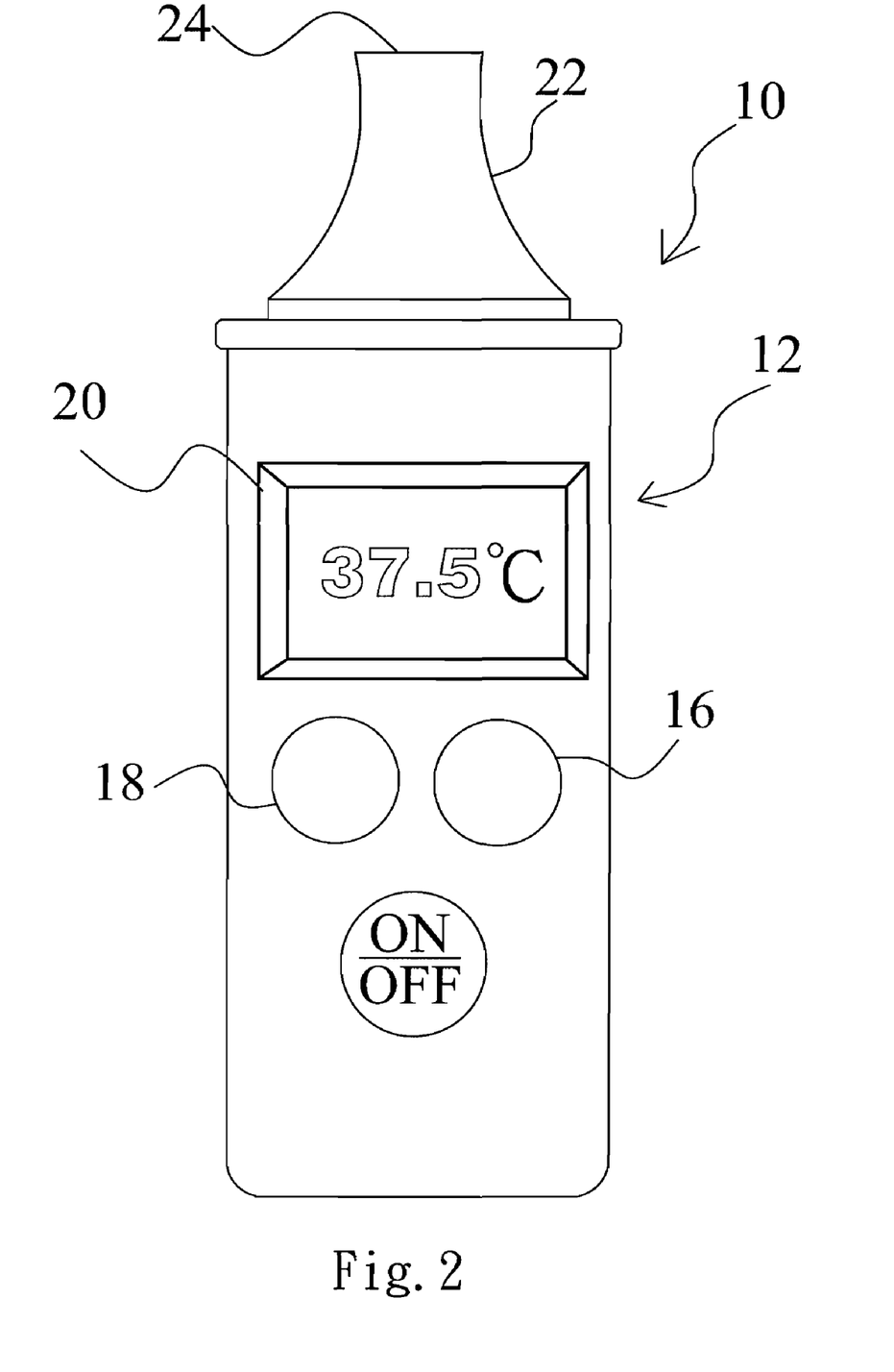
FIG. 2 is a diagram schematically showing a first embodiment of the present invention.
Figure 3:
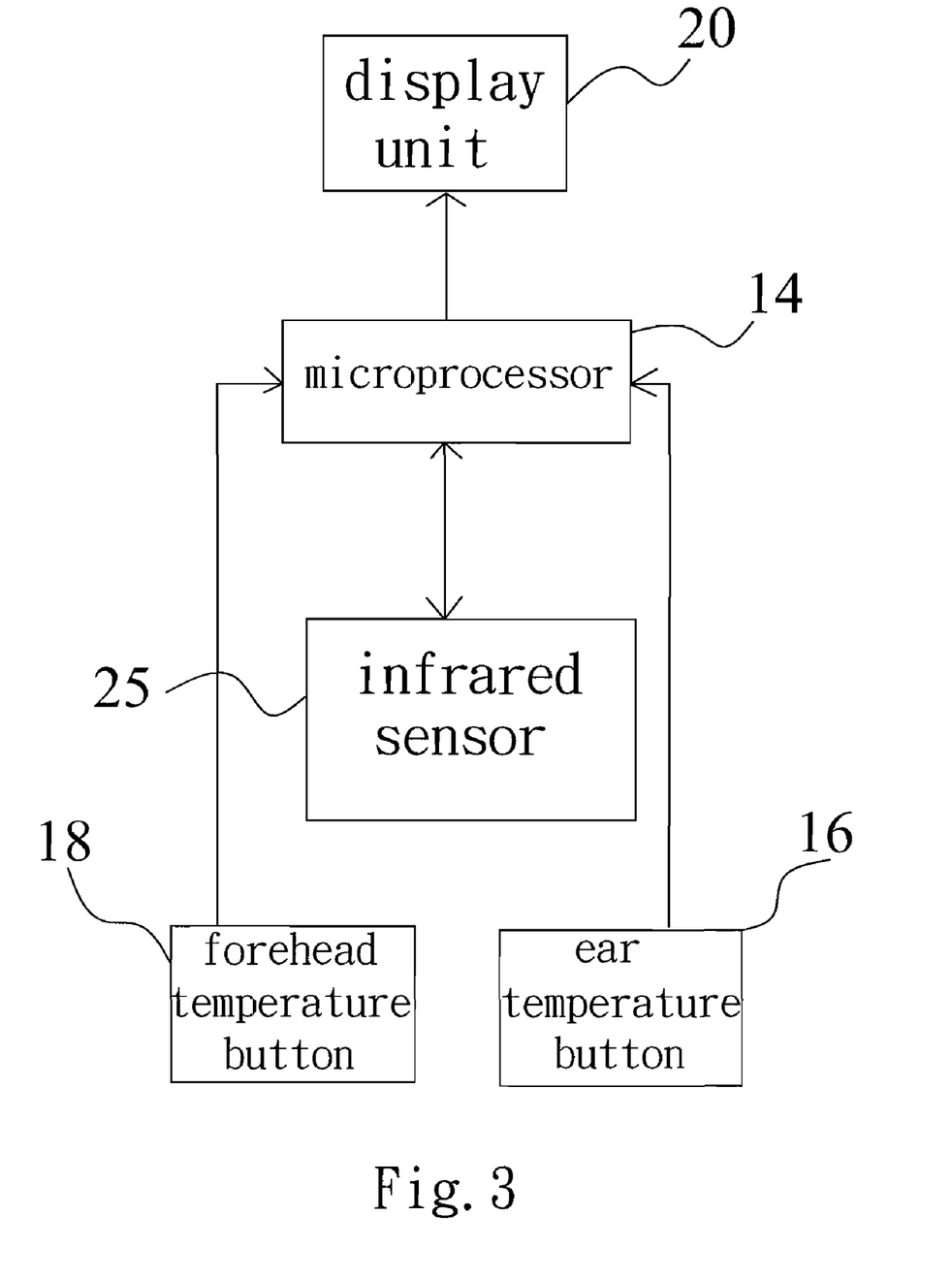
FIG. 3 is a block diagram showing the circuit of the infrared clinical thermometer according to the present invention.

Refer to FIG. 2 and FIG. 3 respectively a diagram schematically showing a first embodiment of the present invention and a block diagram showing the circuit of the infrared clinical thermometer according to the present invention. According to this embodiment, the infrared ear thermometer 10 comprises a thermometer body 12 having a circuit board thereinside (not shown in the drawings); a microprocessor 14 arranged on the circuit board; an ear temperature button 16 and a forehead temperature button 18 arranged on the thermometer body 12 and coupled to the microprocessor 14; a display unit 20 arranged on the thermometer body 12 and coupled to the microprocessor 14; and a temperature sensing unit 22 arranged at one end of the thermometer body 12 wherein the temperature sensing unit 22 comprises an infrared sensor 25 therein and the infrared sensor 25, for detecting infrared radiation from the ear or forehead, is coupled to the microprocessor 14. Further, the temperature sensing unit 22 has a window 24 that is transparent to infrared radiation. The user moves the infrared ear thermometer 10 to make the window 24 approach the measured site (such as the ear or the forehead) when a temperature measurement is undertaken. According to the signal of the ear temperature button 16 or the forehead temperature button 18, the microprocessor 14 determines whether the measurement is an ear temperature mode or a forehead temperature mode and starts the infrared sensor 25 to detect the infrared radiation from the determined site (such as the ear or forehead). The infrared sensor 25 detects infrared radiation from the ear or forehead and then generates an ear/forehead temperature signal, and sends back the ear/forehead temperature signal to the microprocessor 14. Then the microprocessor 14 processes the ear/forehead temperature signal and converts the ear/forehead temperature signal into a measured ear/forehead temperature value, and then the microprocessor 14 transmits the measured ear/forehead temperature value to the display unit 20 for presenting temperature value. The abovementioned display unit 20 may be an LCD device.

When the user intends to measure an ear temperature, he/she moves the temperature sensing unit 22 close to his/her ear and presses the ear temperature button 16. Thus, the microprocessor 14 triggers the infrared sensor 25 to measure an ear temperature. The infrared sensor 25 detects infrared radiation from an ear and generates an ear temperature signal, and then sends back the ear temperature signal to the microprocessor 14. Next, the microprocessor 14 processes the ear temperature signal and converts the ear temperature signal into a measured ear temperature value, and transmits the measured ear temperature value to the display unit 20. Then, the display unit 20 presents the measured ear temperature value thereon. Similarly, when the user intends to measure a forehead temperature, he/she moves the temperature sensing unit 22 close to his/her forehead and presses the forehead temperature button 18. Thus, the microprocessor 14 triggers the infrared sensor 25 to measure a forehead temperature. The infrared sensor 25 detects infrared radiation from a forehead and generates a forehead temperature signal, and then sends back the forehead temperature signal to the microprocessor 14. Next, the microprocessor 14 processes the forehead temperature signal and converts the forehead temperature signal into a measured forehead temperature value, and transmits the measured forehead temperature value to the display unit 20. Then, the display unit 20 presents the measured ear temperature value thereon.

Figure 4:
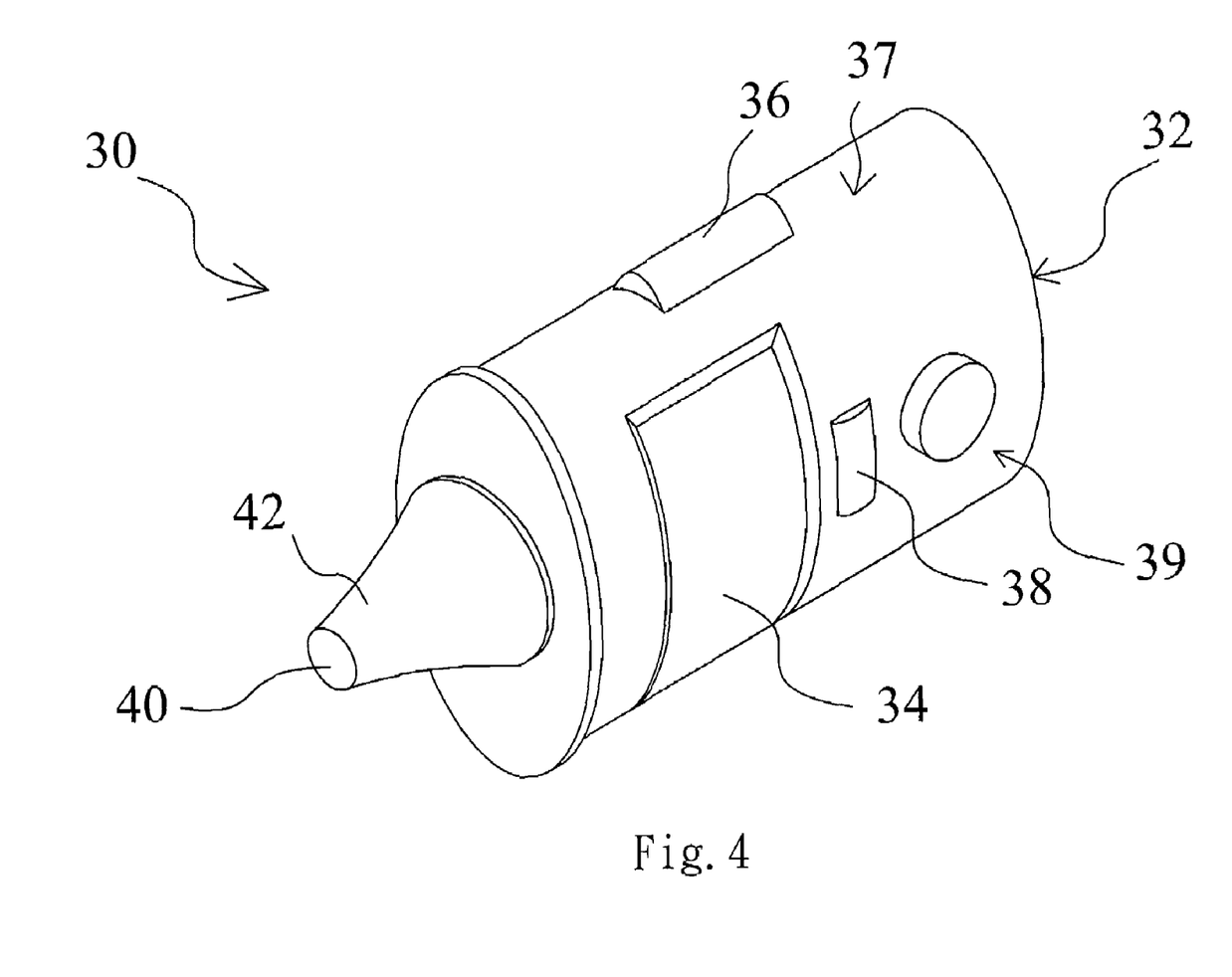
FIG. 4 is a diagram schematically showing a second embodiment of the present invention.

Refer to FIG. 4 a diagram schematically showing a second embodiment of the present invention. According to this embodiment, the infrared ear thermometer 30 comprises a thermometer body 32 having a circuit board (not shown in the drawings); a microprocessor (not shown) arranged on the circuit board for controlling the activities of the infrared ear thermometer 30; a display unit 34 arranged on the thermometer body 32 and coupled to the microprocessor; an ear temperature button 36 and a forehead temperature button 38 arranged on the thermometer body 32 and coupled to the microprocessor; and a temperature sensing unit 42 arranged at one end of the thermometer body 32 and having an infrared sensor (not shown), coupled to the microprocessor, therein for detecting infrared radiation from the ear or forehead, and having a window 40 that is transparent to infrared radiation. The operation of the infrared ear thermometer 30 is similar to that of the infrared ear thermometer 10 and will not repeat herein.

Figure 5:
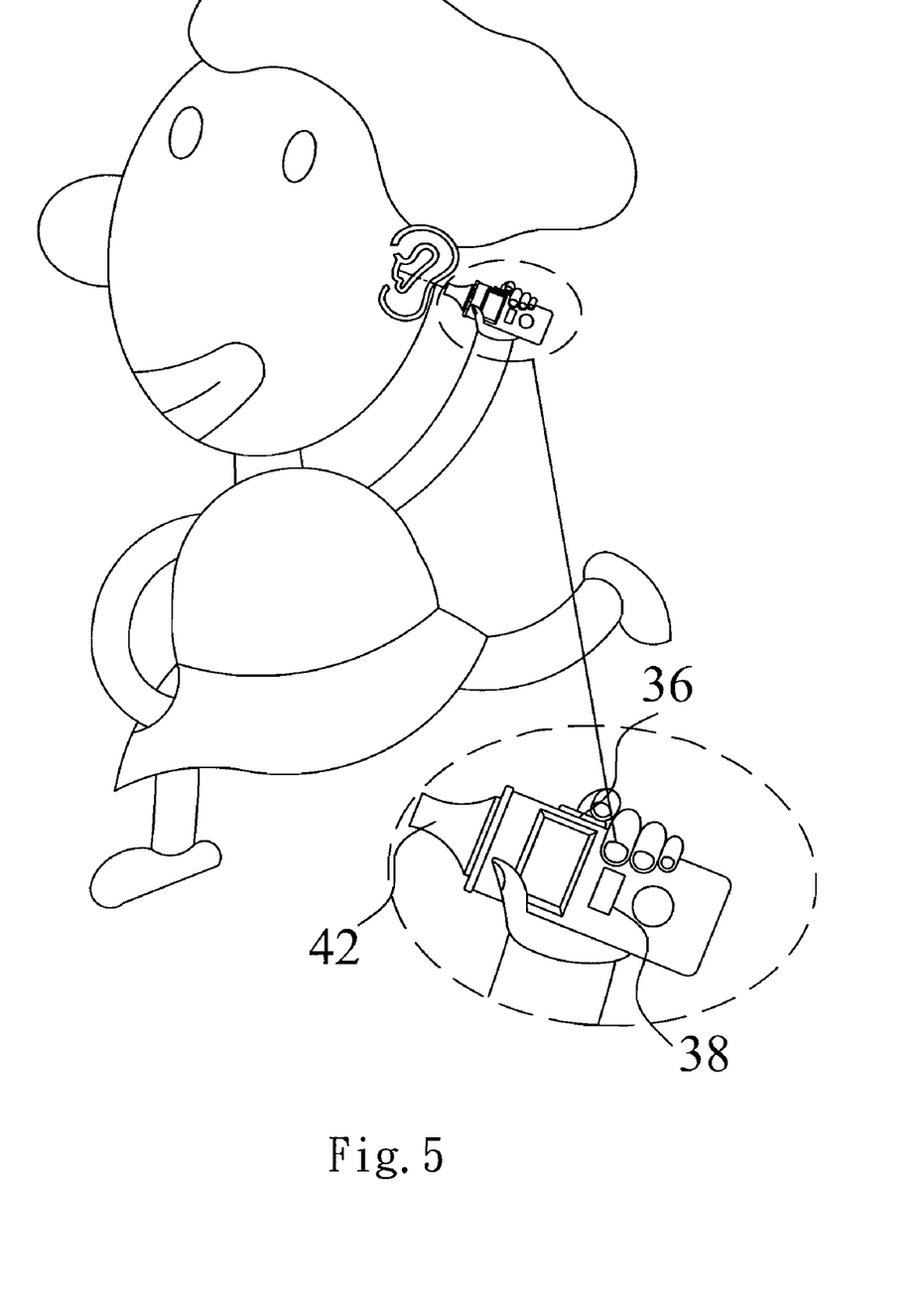
FIG. 5 is a diagram schematically showing the operation of the infrared ear thermometer according to the second embodiment of the present invention.

The difference between the infrared ear thermometer 30 and the infrared ear thermometer 10 is that the ear temperature button 36 and the forehead temperature button 38 are respectively arranged on different surfaces 37 and 39 of the thermometer body 32. Besides, the surface 37 is adjacent to the surface 39. Such a button design can make the user press a correct button. Refer to FIG. 5 a diagram schematically showing the operation of the infrared ear thermometer according to the second embodiment of the present invention. When the user intends to measure an ear temperature, he/she usually holds the thermometer body 32 with the operational posture shown in FIG. 5. Therefore, the ear temperature button 36 is arranged on the surface 37 to meet the operational posture of the hand and the holding method of the fingers and benefit the operation of the ear temperature measurement. Similarly, the forehead temperature button 38 is arranged on the surface 39 to meet the operational posture of the hand and the holding method of the fingers to convenience pointing the temperature sensing unit 42 at the forehead and benefit the operation of the forehead temperature measurement.

Figure 6A:
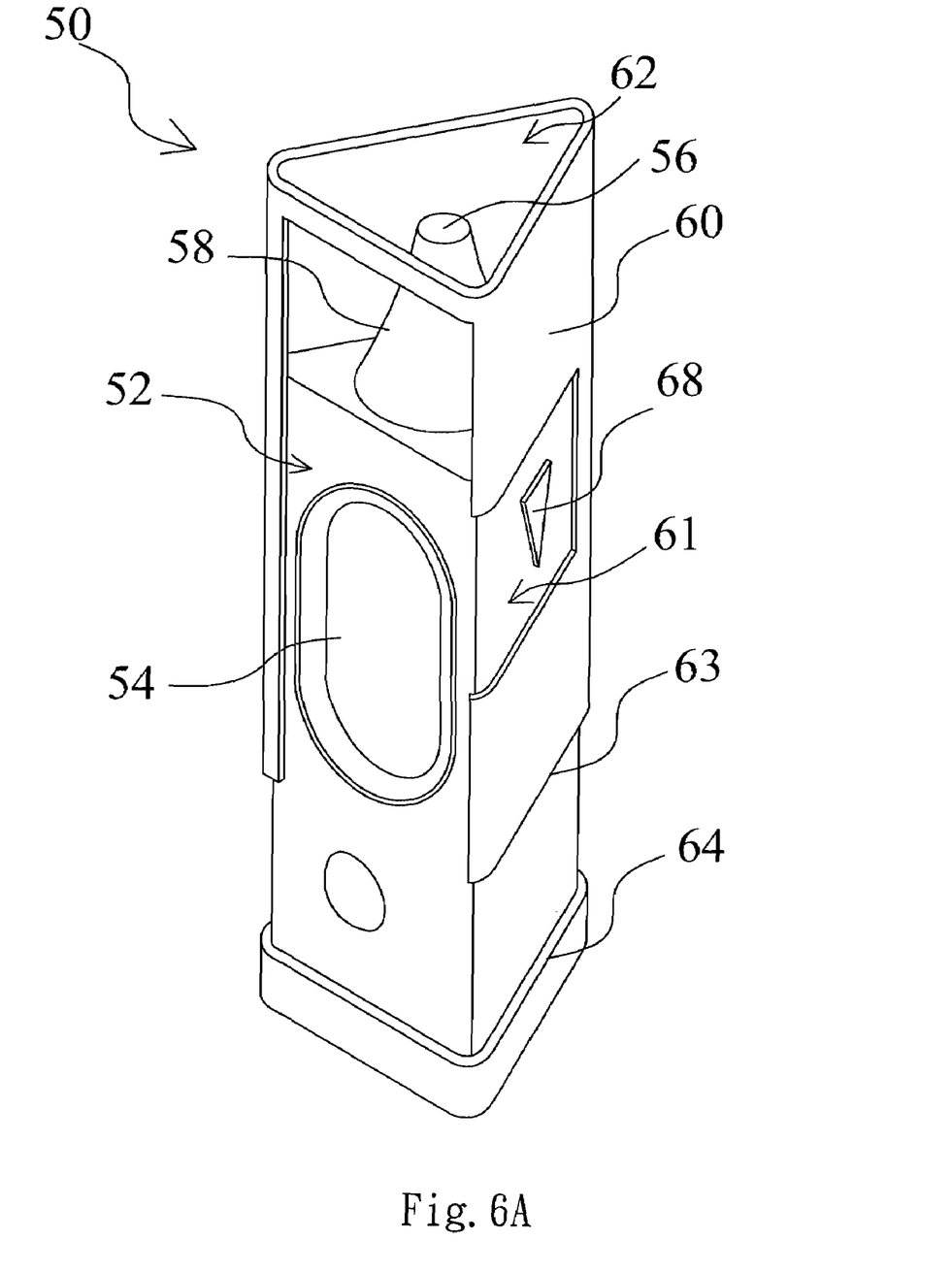
FIG. 6A and FIG. 6B are diagrams schematically showing a third embodiment of the present invention.
Figure 6B:
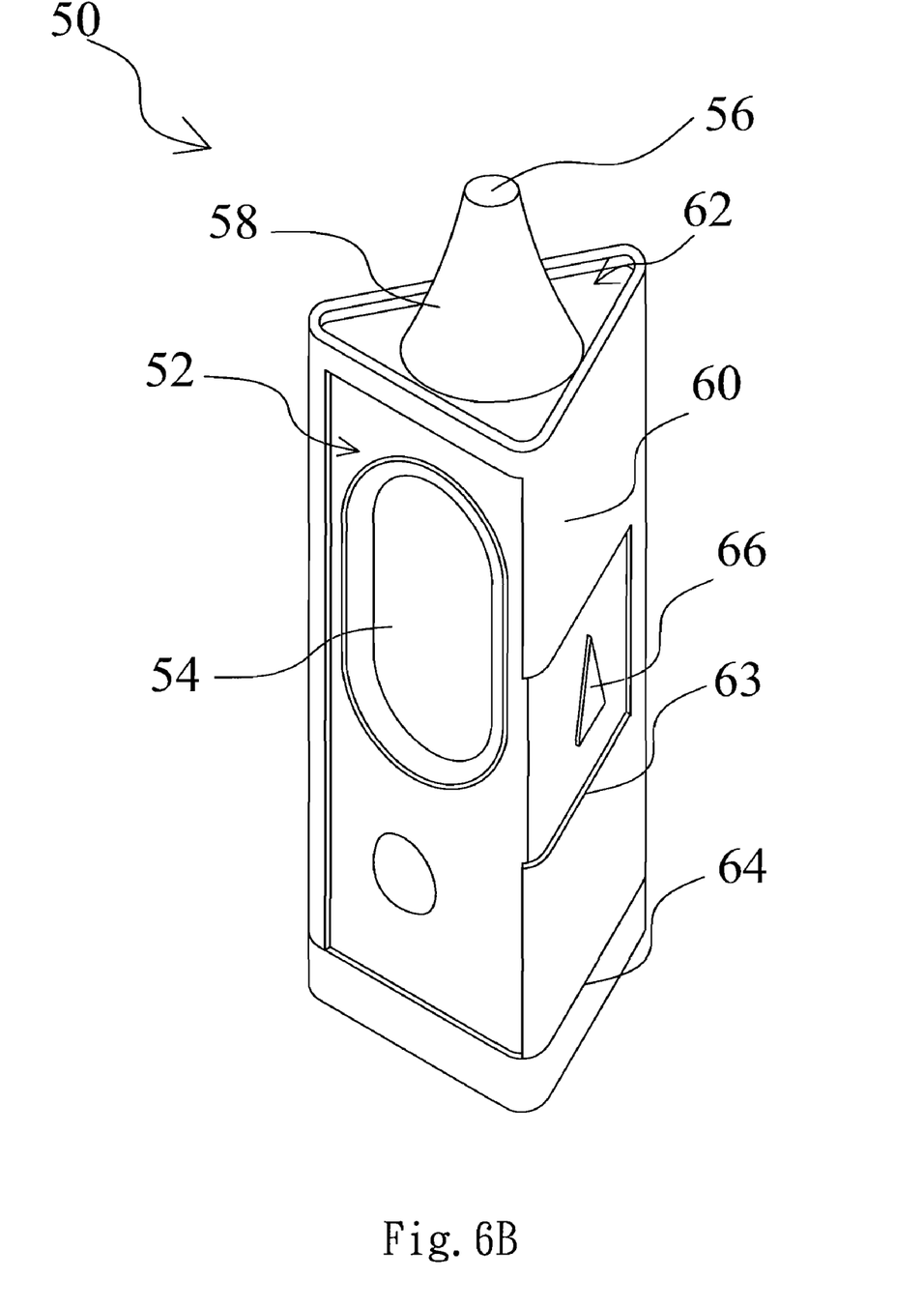

Refer to FIG. 6A and FIG. 6B diagrams schematically showing a third embodiment of the present invention. According to this embodiment, the infrared ear thermometer 50 comprises a thermometer body 52 having a circuit board (not shown in the drawings); a microprocessor (not shown) arranged on the circuit board for controlling the activities of the infrared ear thermometer 50; a display unit 54 arranged on the thermometer body 52 and coupled to the microprocessor; an ear temperature button 66 and a forehead temperature button 68 arranged on the thermometer body 52 and coupled to the microprocessor; a temperature sensing unit 58 arranged at one end of the thermometer body 52 and having an infrared sensor, coupled to the microprocessor, therein for detecting infrared radiation from the ear or forehead, and having a window 56 that is transparent to the infrared radiation; a slide rail arranged on the thermometer body 52 and having a first blocker 63 and a second blocker 64 respectively arranged at two ends of the slide rail; a slide cover 60 sliding on the slide rail and having an opening 62 at the front end thereof and a notch 61. The first blocker 63 is arranged above the second blocker 64 and is closer to the temperature sensing unit 58 than the second blocker 64. The first blocker 63, the second blocker 64, the ear temperature button 66, the forehead temperature button 68 are on a same surface of the thermometer body 52.

Figure 7A:
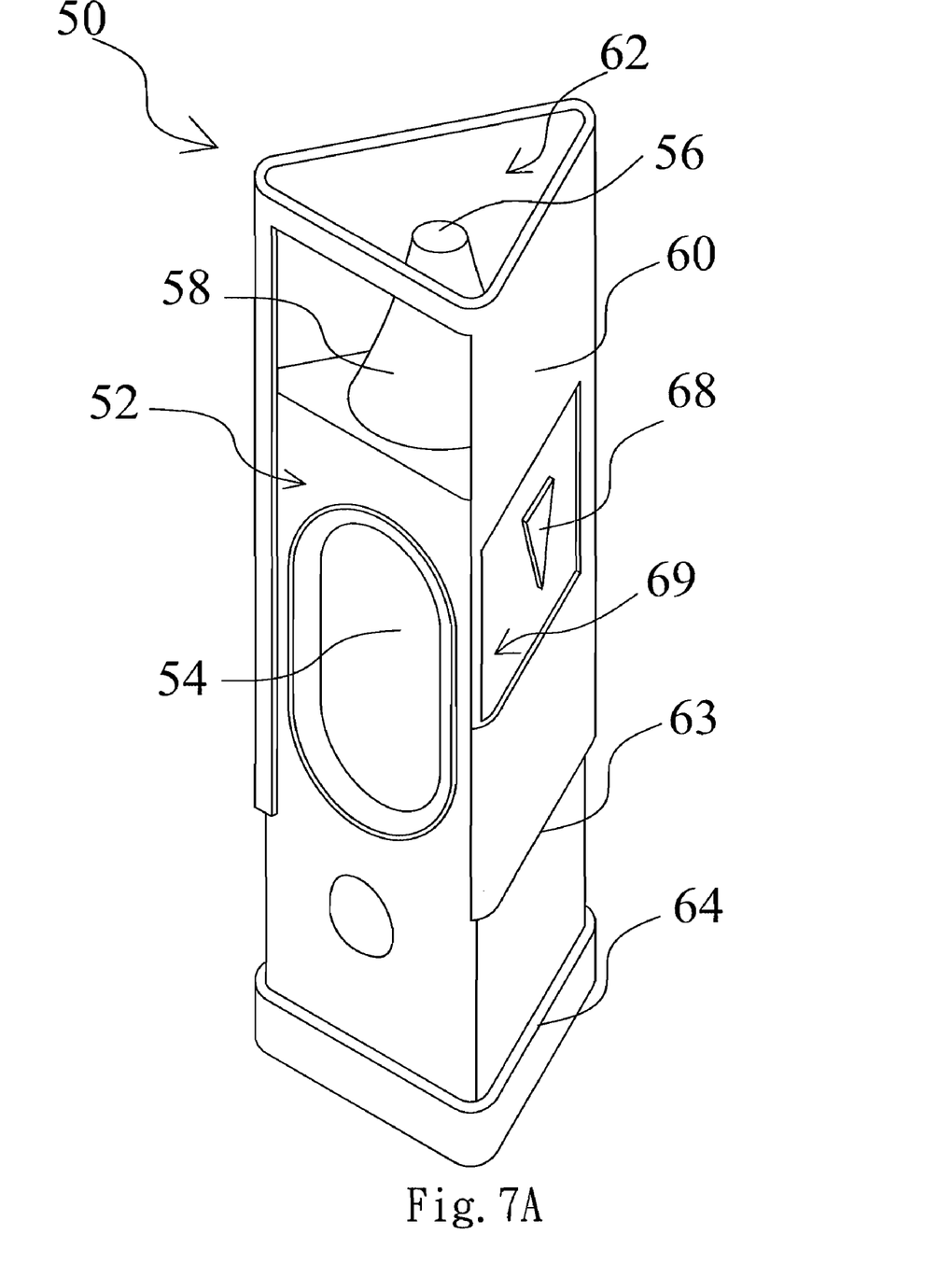
FIG. 7A and FIG. 7B are diagrams schematically showing a fourth embodiment of the present invention.
Figure 7B:
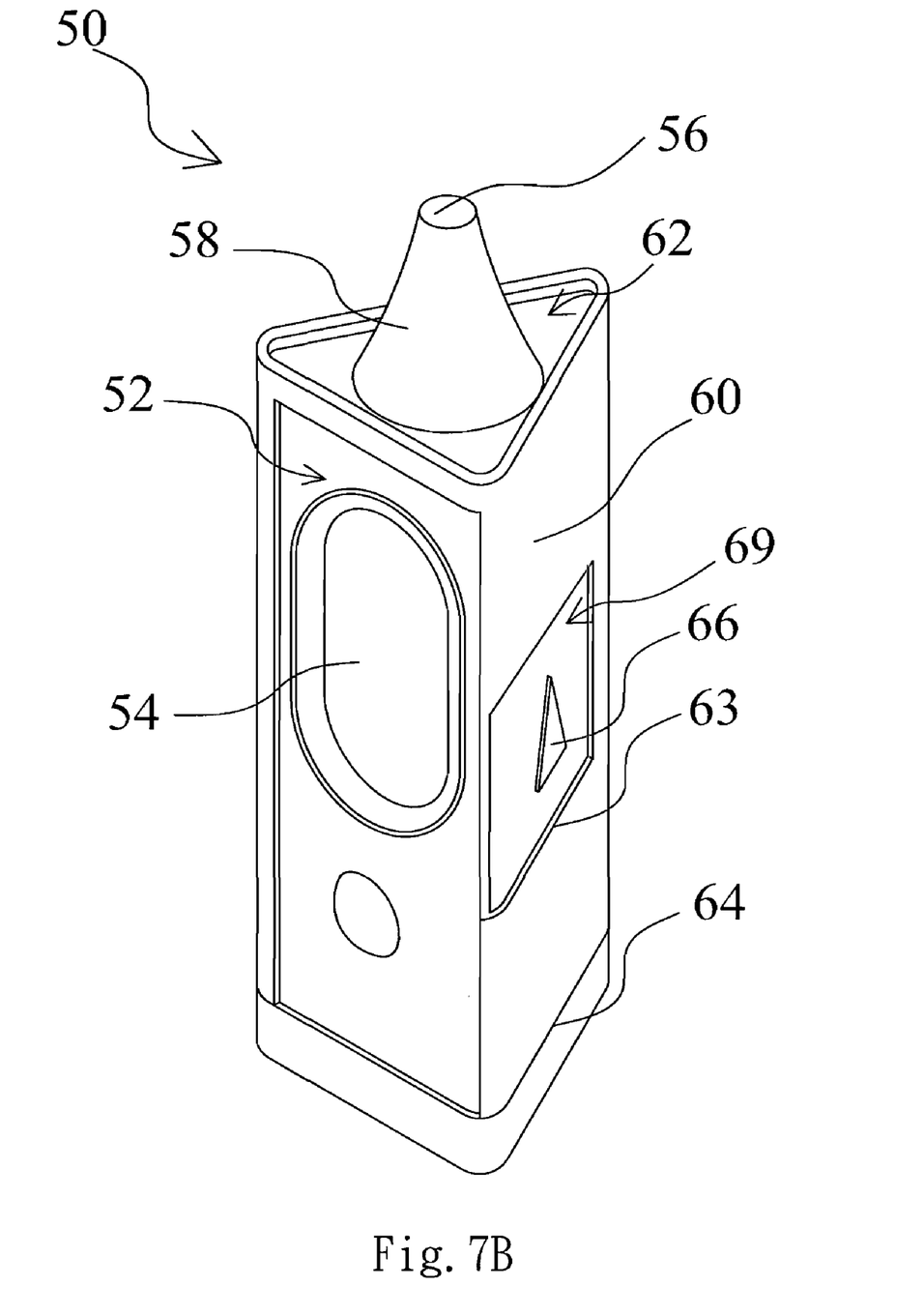

When the user intends to measure a forehead temperature with the aforementioned infrared ear thermometer 50, he/she pushes the slide cover 60 to the first blocker 63. Thus, as shown in FIG. 6A, the ear temperature button 66 is covered by the slide cover 60, and the forehead temperature button 68 is revealed by the notch 61, and the temperature sensing unit 58 is concealed inside the opening 62 of the slide cover 60. Then, the user can measure a forehead temperature via moving the temperature sensing unit 58 close to his/her forehead and pressing the forehead temperature button 68. When the user intends to measure an ear temperature with the aforementioned infrared ear thermometer 50, he/she pushes the slide cover 60 to the second blocker 64. Thus, as shown in FIG. 6B, the forehead temperature button 68 is covered by the slide cover 60, and the ear temperature button 66 is revealed by the notch 61, and the temperature sensing unit 58 emerges from the opening 62 of the slide cover 60. Then, the user can measure an ear temperature via moving the temperature sensing unit 58 close to his/her ear and pressing the ear temperature button 66. Refer to FIG. 7A and FIG. 7B diagrams schematically showing a fourth embodiment of the present invention. Alternatively, the ear temperature button 66 or the forehead temperature button 68 may be revealed by a hole 69 formed on the slide cover 60. Thereby, in the infrared ear thermometer 50, the user can press the correct button to measure the temperature of the intended site via the design of the slide cover 60, which can fast reveal the ear temperature button 66/forehead temperature button 68 corresponding to the measured site.

Figure 8A:
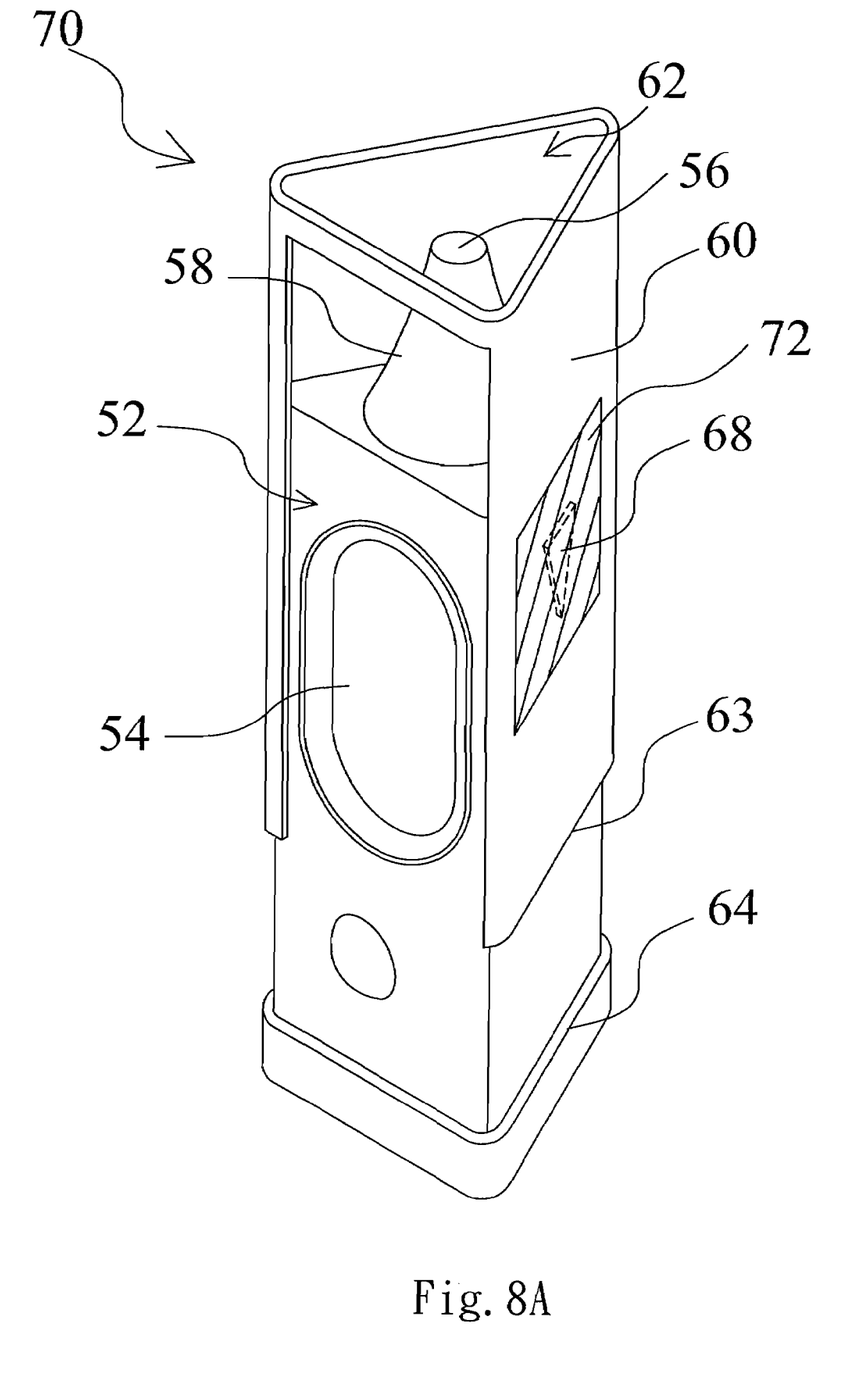
FIG. 8A and FIG. 8B are diagrams schematically showing a fifth embodiment of the present invention.
Figure 8B:
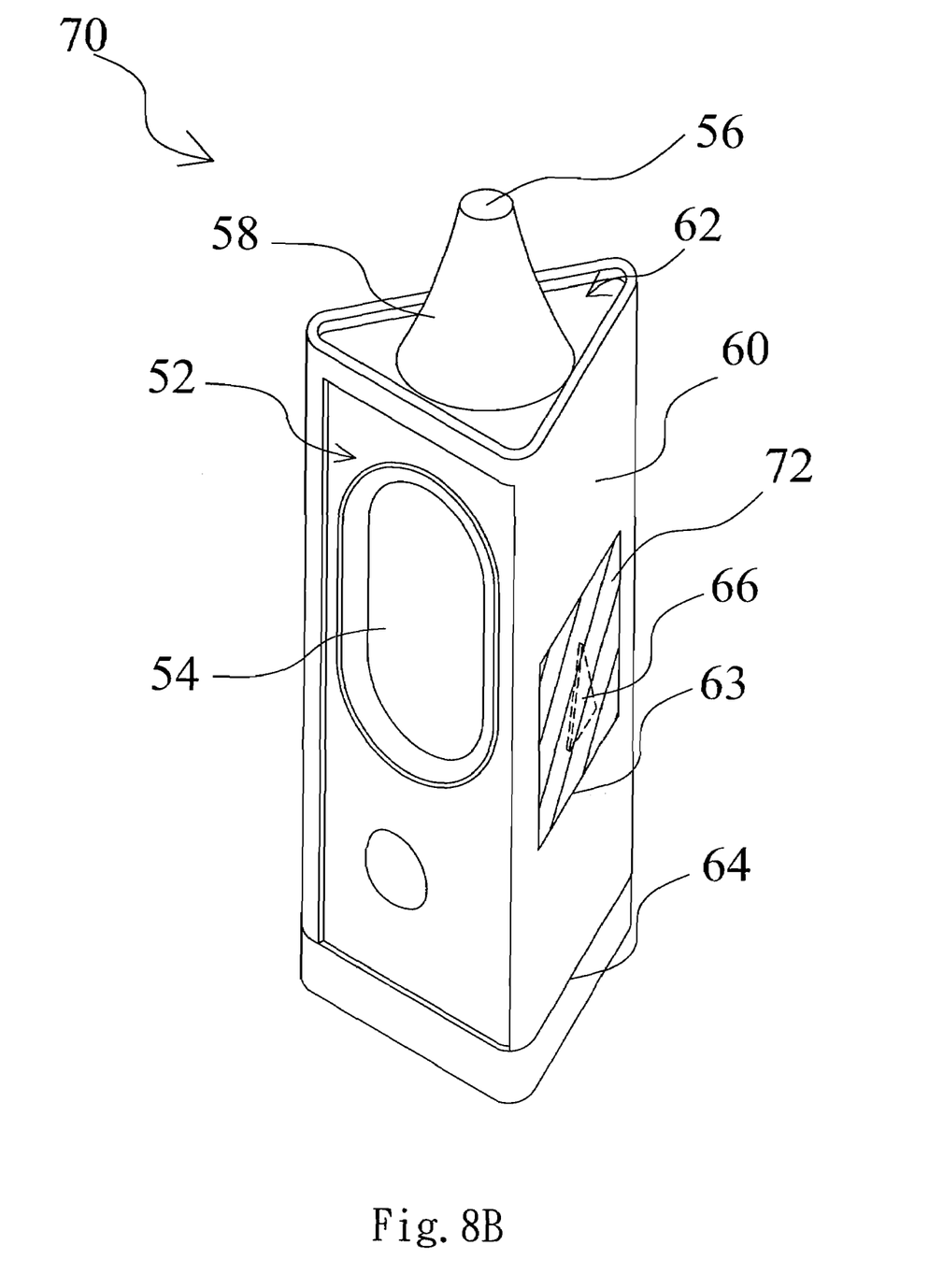

Refer to FIG. 8A and FIG. 8B diagrams schematically showing a fifth embodiment of the present invention. In the infrared ear thermometer 70, the slide cover 60 has a press region 72 made of transparent and elastic plastic material. When the user intends to measure a forehead temperature with the aforementioned infrared ear thermometer 70, he/she pushes the slide cover 60 to the first blocker 63. Thus, as shown in FIG. 8A, the ear temperature button 66 is covered by the slide cover 60, and the forehead temperature button 68 is below the press region 72, and the temperature sensing unit 58 is concealed inside the opening 62 of the slide cover 60. The user can see the forehead temperature button 68 via the transparent press region 72. Then, the user can measure a forehead temperature via moving the temperature sensing unit 58 close to his forehead and pressing the forehead temperature button 68. When the user intends to measure an ear temperature with the aforementioned infrared ear thermometer 70, he pushes the slide cover 60 to the second blocker 64. Thus, as shown in FIG. 8B, the forehead temperature button 68 is covered by the slide cover 60, and the ear temperature button 66 is below the press region 72, and the temperature sensing unit 58 emerges from the opening 62 of the slide cover 60. Then, the user can measure an ear temperature via moving the temperature sensing unit 58 close to his ear and pressing the ear temperature button 66.

In contrast to the conventional technology that an infrared clinical thermometer cannot perform the measurement of a forehead temperature or an ear temperature unless a corresponding cover has been put on the probe, the present invention can perform the measurement of a forehead temperature or an ear temperature via merely pressing a forehead temperature button or an ear temperature button without the problem of losing the covers. Further, in the present invention, the design of the positions of the ear and forehead temperature buttons or the design of the button positions plus the design of the slide cover can help the user press a correct button to fast obtain the measurement result. In addition to the abovementioned conveniences, the present invention can also provide a low-cost infrared clinical thermometer because of its simple structure.

Those embodiments described above are only to exemplify the present invention to enable the persons skilled in the art to understand, male and use the present invention but not to limit the scope of the present invention. Any equivalent modification or variation according to the spirit of the present invention is to be also included within the scope of the present invention.

What is claimed is:

1. An infrared clinical thermometer, which is capable of measuring an ear temperature and a forehead temperature comprising:
    a body;
    an ear temperature button on said body;
    a forehead temperature button on said body;
    a temperature sensing unit at one end of said body and having an infrared sensor therein for detecting infrared radiation ;
    a microprocessor coupled to said ear temperature button, said forehead temperature button and said infrared sensor, wherein when said ear temperature button or said forehead temperature button is pressed, said infrared sensor performs an ear temperature measurement or a forehead temperature measurement;
    a slide rail on said body and having a first blocker and a second blocker, wherein said first blocker is closer to said temperature sensing unit than said second blocker is, and said ear temperature button, said forehead temperature button, said first blocker and said second blocker are on a same surface of said body; and
    a slide cover having an opening at a front end thereof, sliding on said slide rail between said first blocker and second blocker, covering said ear temperature button and revealing said forehead temperature button with said temperature sensing unit inside said opening when sliding to said first blocker, covering said forehead temperature button and revealing said ear temperature button with said temperature sensing unit emerging from said opening when sliding to said second blocker.

2. The infrared clinical thermometer according to claim 1, wherein when said ear temperature button is pressed, said microprocessor starts said infrared sensor to perform said ear temperature measurement for detecting infrared radiation from an ear, and said infrared sensor generates an ear temperature signal and then sends the ear temperature signal to said microprocessor.

3. The infrared clinical thermometer according to claim 1, wherein when said forehead temperature button is pressed, said microprocessor starts said infrared sensor to perform said forehead temperature measurement for detecting infrared radiation from a forehead, and said infrared sensor generates a forehead temperature signal and sends the forehead temperature signal to said microprocessor.

4. The infrared clinical thermometer according to claim 1, further comprising a display unit, which is on said body, coupled to said microprocessor, and used to present a result of said ear temperature measurement or said forehead temperature measurement.

5. The infrared clinical thermometer according to claim 4, wherein said display unit is a liquid crystal display device.

6. The infrared clinical thermometer according to claim 1, wherein said temperature sensing unit further has a window transparent to infrared radiation, and said window is moved close to a measured site of an ear or a forehead when said infrared sensor performs said ear or forehead temperature measurement.

7. The infrared clinical thermometer according to claim 1, wherein said ear temperature button is on one surface of said body, and said forehead temperature button is on another surface of said body.

8. The infrared clinical thermometer according to claim 7, wherein said one surface is on a first surface of said body, and said another surface is on a second surface of said body, and said first surface is adjacent to said second surface.

9. The infrared clinical thermometer according to claim 1, wherein said slide cover has a notch used to reveal said ear temperature button or said forehead temperature button.

10. The infrared clinical thermometer according to claim 1, wherein said slide cover has a hole used to reveal said ear temperature button or said forehead temperature button.

11. The infrared clinical thermometer according to claim 1, further comprising a slide rail on said body and having a first blocker and a second blocker, wherein said first blocker is closer to said temperature sensing unit than said second blocker is, and said ear temperature button, said forehead temperature button, said first blocker and said second blocker are on a same surface of said body; and a slide cover having an opening at a front end thereof, sliding on said slide rail between said first blocker and second blocker, and having a press region made of transparent and elastic plastic material, wherein when said slide cover slides to said first blocker, said forehead temperature button is below said press region, and said temperature sensing unit is inside said opening of said slide cover; when said slide cover slides to said second blocker, said ear temperature button is below said press region, said temperature sensing unit emerges from said opening of said slide cover.

* * * * *